United States Patent
Murakami (10) Patent No.: US 10,604,140 B2
(45) Date of Patent: Mar. 31, 2020

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Koji Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 16/182,056

(22) Filed: Nov. 6, 2018

(65) Prior Publication Data

US 2019/0184964 A1    Jun. 20, 2019

(30) Foreign Application Priority Data

Dec. 20, 2017    (JP) .................................. 2017-244329

(51) Int. Cl.
*B60W 20/00* (2016.01)
*B60K 6/28* (2007.10)
*B60K 6/26* (2007.10)
*B60K 6/40* (2007.10)

(52) U.S. Cl.
CPC .............. *B60W 20/00* (2013.01); *B60K 6/26* (2013.01); *B60K 6/28* (2013.01); *B60K 6/40* (2013.01); *B60K 2006/268* (2013.01); *B60Y 2200/92* (2013.01); *B60Y 2300/192* (2013.01)

(58) Field of Classification Search
None
See application file for complete search history.

(56) References Cited

U.S. PATENT DOCUMENTS

| | | | |
|---|---|---|---|
| 2009/0206660 A1* | 8/2009 | Makita | H02J 7/1423 307/9.1 |
| 2011/0093147 A1* | 4/2011 | Kaltenbach | B60W 20/40 701/22 |
| 2014/0244082 A1* | 8/2014 | Caron | B60K 6/46 701/22 |

FOREIGN PATENT DOCUMENTS

| JP | 2002-176704 A | 6/2002 |
|---|---|---|
| JP | 2003-070103 A | 3/2003 |

* cited by examiner

*Primary Examiner* — Jared Fureman
*Assistant Examiner* — Aqeel H Bukhari
(74) *Attorney, Agent, or Firm* — Oliff PLC (57) ABSTRACT

A hybrid vehicle includes an engine, a motor generator, a main battery, a DC-DC converter, a sub-battery, a starter, and an electronic control unit. The DC-DC converter is a bidirectional converter configured to convert a voltage of electric power from the sub-battery and output the electric power to the motor generator. The electronic control unit is configured to control the DC-DC converter such that the sub-battery outputs electric power to the motor generator when a first available electrical energy of the main battery is smaller than a required electrical energy at the time when the engine is started with the use of the motor generator.

7 Claims, 3 Drawing Sheets

HYBRID VEHICLE AND CONTROL METHOD FOR HYBRID VEHICLE

INCORPORATION BY REFERENCE

The disclosure of Japanese Patent Application No. 2017-244329 filed on Dec. 20, 2017 including the specification, drawings and abstract is incorporated herein by reference in its entirety.

BACKGROUND

1. Technical Field

The disclosure relates to a hybrid vehicle and a control method for a hybrid vehicle.

2. Description of Related Art

A hybrid system described in Japanese Unexamined Patent Application Publication No. 2003-070103 (JP 2003-070103 A) includes a drive motor generator and a main battery. The motor generator is drivingly coupled to an engine. The main battery supplies electric power to the motor generator. The hybrid system described in JP 2003-070103 A further includes a DC-DC converter, a sub-battery, and a starter. The DC-DC converter steps down electric power from the main battery, and outputs the stepped-down electric power. Electric power from the DC-DC converter is input to the sub-battery. The starter is used to start the engine. The starter is supplied with electric power from the sub-battery. In the hybrid system described in JP 2003-070103 A, when an ignition switch (an ignition switch for the engine) is turned on, the engine is started with the use of the starter. On the other hand, in the hybrid system described in JP 2003-070103 A, when the engine is restarted after the engine is automatically stopped, for example, while the vehicle stops at a red light, the engine is started with the use of the motor generator.

SUMMARY

In the hybrid system described in JP 2003-070103 A, in order to start the engine with the motor generator, an appropriate state of charge needs to be secured as a state of charge of the main battery that supplies electric power to the motor generator. On the other hand, in the hybrid system described in JP 2003-070103 A, when the state of charge of the main battery is low, the engine has to be started with the use of the starter that is supplied with electric power from the sub-battery.

However, a direct-current motor is generally used as a starter that is provided in a hybrid system of this type. For this reason, peculiar motor sound occurs at the time of starting the engine with the use of the starter, and this motor sound may be perceived by an occupant as noise. Therefore, from the viewpoint of reduction of noise, it is desired to start the engine with the use of the relatively quiet alternating-current motor generator as much as possible even when the state of charge of the main battery is somewhat low.

A first aspect of the disclosure provides a hybrid vehicle. The hybrid vehicle includes an engine, a motor generator coupled to the engine, a main battery configured to supply electric power to the motor generator, a DC-DC converter configured to convert a voltage of electric power from the main battery and the motor generator and output the electric power, a sub-battery configured to be supplied with electric power from the DC-DC converter, a starter configured to start the engine when supplied with direct-current power from the sub-battery, and an electronic control unit configured to start the engine with the use of any one of the starter and the motor generator. The DC-DC converter is a bidirectional converter configured to convert a voltage of electric power from the sub-battery and output the electric power to the motor generator. The electronic control unit is configured to control the DC-DC converter such that the sub-battery outputs electric power to the motor generator when a first available electrical energy of the main battery is smaller than a required electrical energy at the time when the engine is started with the use of the motor generator. The required electrical energy is set as a value larger than or equal to a minimum electrical energy required to start the engine with the use of the motor generator.

With the above configuration, even when the first available electrical energy of the main battery is smaller than the minimum electrical energy required to start the engine with the use of the motor generator, it is possible to start the engine with the use of the motor generator by receiving electric power supplied from the sub-battery. Therefore, in comparison with the technique that the engine is not able to be started with the use of the motor generator when the first available electrical energy of the main battery is smaller than the required electrical energy, there are a larger number of opportunities to start the engine with the use of the motor generator.

In the hybrid vehicle, the electronic control unit may be configured to, when the first available electrical energy of the main battery is larger than or equal to the required electrical energy, control the DC-DC converter such that the main battery outputs electric power to the sub-battery, and start the engine with the use of the motor generator.

With the above configuration, when the first available electrical energy of the main battery is larger than or equal to the required electrical energy, supply of electric power from the main battery to the sub-battery via the DC-DC converter is not stopped, and charging of the sub-battery is continued. Therefore, it is possible to reduce degradation of the sub-battery due to a repetition of charging and non-charging of the sub-battery.

In the hybrid vehicle, the electronic control unit may be configured to, when the first available electrical energy of the main battery is larger than or equal to the required electrical energy, control the DC-DC converter such that an electrical energy that is output from the main battery to the sub-battery reduces as the first available electrical energy of the main battery approaches the required electrical energy.

With the above configuration, when the first available electrical energy of the main battery is close to the required electrical energy, it is less likely that electric power that is supplied to the motor generator is insufficient due to an excessive electrical energy supplied from the main battery to the sub-battery. Therefore, it is possible to continue supply of electric power from the main battery to the sub-battery while reliably starting the engine with the use of the motor generator.

In the hybrid vehicle, the electronic control unit may be configured to calculate a second available electrical energy available to be supplied from the sub-battery to the motor generator. The electronic control unit may be configured to, when the first available electrical energy of the main battery is larger than or equal to a value obtained by subtracting the second available electrical energy from the required electrical energy and is smaller than the required electrical energy, control the DC-DC converter such that the sub-battery outputs electric power to the motor generator, and start the engine with the use of the motor generator. The electronic control unit may be configured to, when the first available electrical energy of the main battery is smaller than the value obtained by subtracting the second available electrical energy from the required electrical energy, control the DC-DC converter such that the main battery outputs electric power to the sub-battery, and start the engine with the use of the starter.

With the above configuration, when the first available electrical energy of the main battery has decreased to such an extent that it is not possible to start the engine even with electric power supplied from the sub-battery, the engine is started with the use of the starter. Therefore, it is possible to suppress an excessive decrease in the state of charge of the main battery or sub-battery due to starting of the engine unreasonably with the use of the motor generator.

In the hybrid vehicle, the electronic control unit may be configured to calculate the second available electrical energy such that the second available electrical energy increases as a state of charge of the sub-battery increases. With the above configuration, when the state of charge of the sub-battery is high, there are a larger number of opportunities to start the engine with the use of the motor generator. On the other hand, when the state of charge of the sub-battery is low, the engine is started with the use of the starter, so it is possible to suppress an excessive decrease in the state of charge of the sub-battery.

The hybrid vehicle may further include a temperature sensor configured to detect a coolant temperature of the engine. The electronic control unit may be configured to calculate the required electrical energy such that the required electrical energy increases as the coolant temperature of the engine decreases. When the coolant temperature of the engine is low, the viscosity of oil that lubricates components of the engine is high and the static friction of each of these components is large, so a larger energy is required to start the engine. For this reason, with the above configuration, in calculating the required electrical energy, the static friction of each of the components is also taken into consideration, so it is possible to accurately calculate the required electrical energy.

A second aspect of the disclosure provides a control method for a hybrid vehicle. The hybrid vehicle includes an engine, a motor generator coupled to the engine, a main battery configured to supply electric power to the motor generator, a DC-DC converter configured to convert a voltage of electric power from the main battery and the motor generator and output the electric power, a sub-battery configured to be supplied with electric power from the DC-DC converter, a starter configured to start the engine when supplied with direct-current power from the sub-battery, and an electronic control unit configured to start the engine with the use of any one of the starter and the motor generator. The DC-DC converter is a bidirectional converter configured to convert a voltage of electric power from the sub-battery and output the electric power to the motor generator. The control method includes, controlling, by the electronic control unit, the DC-DC converter such that the sub-battery outputs electric power to the motor generator when a first available electrical energy of the main battery is smaller than a required electrical energy at the time when the engine is started with the use of the motor generator. The required electrical energy is set as a value larger than or equal to a minimum electrical energy required to start the engine with the use of the motor generator.

With the above configuration, even when the first available electrical energy of the main battery is smaller than the minimum required electrical energy required to start the engine with the use of the motor generator, it is possible to start the engine with the use of the motor generator by receiving electric power supplied from the sub-battery. Therefore, in comparison with the technique that the engine is not able to be started with the use of the motor generator when the first available electrical energy of the main battery is smaller than the required electrical energy, there are a larger number of opportunities to start the engine with the use of the motor generator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
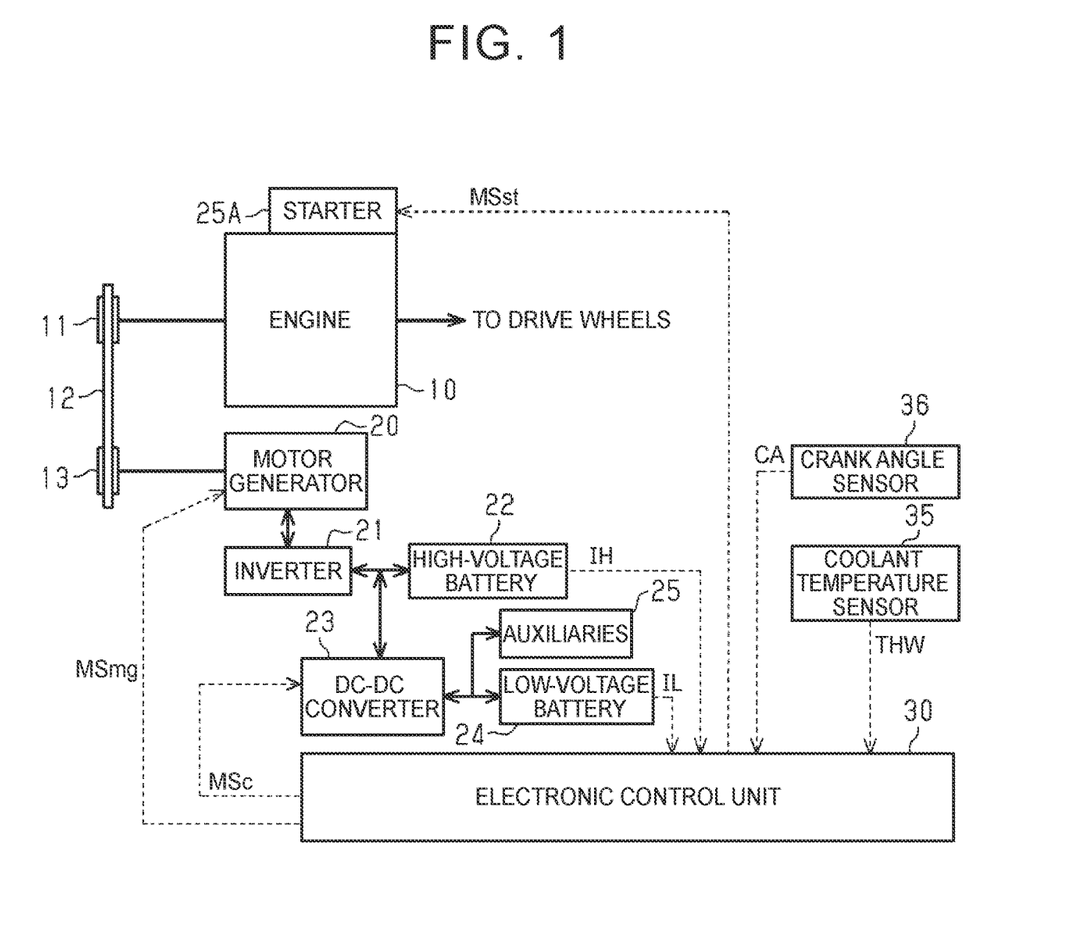
FIG. 1 is a schematic configuration diagram of a hybrid system.

Hereinafter, an embodiment of the disclosure will be described. First, the schematic configuration of a hybrid system will be described with reference to FIG. 1. As shown in FIG. 1, the hybrid system includes an engine 10 and a motor generator 20 as driving sources. The crankshaft of the engine 10 is drivingly coupled to drive wheels via a transmission (not shown), and the like. The crankshaft of the engine 10 is drivingly coupled to a first pulley 11. A transmission belt 12 is wound around the first pulley 11. Although not shown in the drawing, the crankshaft of the engine 10 is also drivingly coupled to a pump for generating hydraulic pressure, a compressor of an air conditioner, and the like, via a belt, a pulley, a chain, or the like.

The motor generator 20 is a so-called three-phase alternating-current motor. The output shaft of the motor generator 20 is drivingly coupled to a second pulley 13. The transmission belt 12 is wound around the second pulley 13. That is, the motor generator 20 is drivingly coupled to the engine 10 via the second pulley 13, the transmission belt 12, and the first pulley 11. When the motor generator 20 functions as an electric motor, the motor generator 20 supplies rotating torque to the second pulley 13. The rotating torque is input to the crankshaft of the engine 10 via the transmission belt 12 and the first pulley 11. That is, the motor generator 20 assists the engine 10. On the other hand, when the motor generator 20 functions as a generator, the rotating torque of the crankshaft of the engine 10 is input to the output shaft of the motor generator 20 via the first pulley 11, the transmission belt 12, and the second pulley 13. The motor generator 20 generates electric power with the rotation of the output shaft.

A high-voltage battery 22 is connected to the motor generator 20 via an inverter 21. The high-voltage battery 22 serves as a main battery. The inverter 21 is a so-called bidirectional inverter. The inverter 21 converts alternating-current voltage generated by the motor generator 20 to direct-current voltage, and outputs the direct-current voltage to the high-voltage battery 22. The inverter 21 also converts direct-current voltage output from the high-voltage battery 22 to alternating-current voltage, and outputs the alternating-current voltage to the motor generator 20. In FIG. 1, the inverter 21 is drawn as a unit separated from the motor generator 20. The inverter 21 may be contained inside the housing of the motor generator 20.

The high-voltage battery 22 is, for example, a 48 V lithium ion battery. When the motor generator 20 functions as an electric motor, the high-voltage battery 22 supplies electric power to the motor generator 20. When the motor generator 20 functions as a generator, the high-voltage battery 22 is charged with electric power supplied from the motor generator 20.

A DC-DC converter 23 is connected to the motor generator 20 via the inverter 21. The DC-DC converter 23 is also connected to the high-voltage battery 22. These motor generator 20 and high-voltage battery 22 are connected to a low-voltage battery 24 via the DC-DC converter 23. The low-voltage battery 24 serves as a sub-battery.

The low-voltage battery 24 is a 12 V lead acid battery lower in voltage than the high-voltage battery 22. When the DC-DC converter 23 is not driven or when the output voltage of the DC-DC converter 23 is lower than or equal to an open circuit voltage (OCV), the low-voltage battery 24 outputs a direct-current voltage of 12 V. When the output voltage of the DC-DC converter 23 is higher than the open circuit voltage (OCV) of the low-voltage battery 24, the low-voltage battery 24 is charged with electric power supplied from the DC-DC converter 23.

The DC-DC converter 23 is a so-called bidirectional (step-up/step-down) DC-DC converter. The DC-DC converter 23 steps down direct-current voltage, which is output from the inverter 21 or the high-voltage battery 22, to approximately 12 V to 15 V, and outputs the stepped-down voltage. The DC-DC converter 23 steps up direct-current voltage, which is output from the low-voltage battery 24, to approximately 48 V to 60 V, and outputs the stepped-up voltage.

Various auxiliaries 25 are connected to the DC-DC converter 23 and the low-voltage battery 24. Examples of the auxiliaries 25 include lighting components, such as headlamps, direction indicator lamps, and interior lamp of the vehicle, and cabin interior equipment, such as a car navigation system and speakers. When the DC-DC converter 23 is not driven, the auxiliaries 25 receive electric power supplied from the low-voltage battery 24. When the output voltage of the DC-DC converter 23 is higher than the open circuit voltage (OCV) of the low-voltage battery 24, the auxiliaries 25 receive electric power supplied from the DC-DC converter 23.

A starter 25A for starting the engine 10 is further connected to the DC-DC converter 23 and the low-voltage battery 24 as one of the above-described auxiliaries 25. The starter 25A is a direct-current motor. The output shaft of the starter 25A is drivingly coupled to the drive shaft of the engine 10. The starter 25A is driven upon reception of electric power supplied from the low-voltage battery 24 or the DC-DC converter 23.

The hybrid system includes an electronic control unit 30. The electronic control unit 30 serves as an engine start control unit that executes control to start the engine 10. Specifically, the electronic control unit 30 starts the engine 10 with the use of any one of the starter 25A and the motor generator 20, selected based on the state of charge of the high-voltage battery 22, the state of charge of the low-voltage battery 24, and the like. The electronic control unit 30 is a processing circuit (computer) including an operation unit, a nonvolatile ROM, a volatile RAM, and the like. The operation unit executes various programs (applications). Programs, and the like, are stored in the ROM. Data are temporarily stored in the RAM at the time of executing programs.

A signal indicating status information IH of the high-voltage battery 22 is input from the high-voltage battery 22 to the electronic control unit 30. Examples of the status information IH of the high-voltage battery 22 include an output voltage value, output current value, and temperature of the high-voltage battery 22. The electronic control unit 30 estimates a state of charge (SOC) and state of health (SOH) of the high-voltage battery 22 based on the status information IH of the high-voltage battery 22. In this embodiment, the state of charge of the high-voltage battery 22 is an electrical energy that is stored in the high-voltage battery 22 at the time when the status information IH has been input. The state of health of the high-voltage battery 22 is an index that indicates how much a full state of charge of the high-voltage battery 22 at the time when the status information IH has been input is lower than a full state of charge at the time of factory shipment (initial full state of charge).

A signal indicating status information IL of the low-voltage battery 24 is input from the low-voltage battery 24 to the electronic control unit 30. Examples of the status information IL of the low-voltage battery 24 include an output voltage value, output current value, and temperature of the low-voltage battery 24. The electronic control unit 30 estimates the state of charge and state of health of the low-voltage battery 24 based on the status information IL of the low-voltage battery 24.

Signals from various sensors, and the like, mounted on the vehicle are further input to the electronic control unit 30. Specifically, a signal indicating a coolant temperature THW of the engine 10 is input from a coolant temperature sensor 35 to the electronic control unit 30. The coolant temperature sensor 35 is attached to an outlet portion of a water jacket defined in a cylinder block and a cylinder head in the engine 10. The coolant temperature sensor 35 detects the temperature of coolant at the outlet portion of the water jacket as the coolant temperature THW. A signal indicating a rotation angle CA of the drive shaft (crankshaft) of the engine 10 per unit time is input from a crank angle sensor 36 to the electronic control unit 30.

The electronic control unit 30 calculates an operation signal MSmg for controlling the motor generator 20 based on various signals to be input, and outputs the operation signal MSmg to the motor generator 20. The electronic control unit 30 calculates an operation signal MSc for controlling the DC-DC converter 23 based on various signals to be input, and outputs the operation signal MSc to the DC-DC converter 23. Furthermore, the electronic control unit 30 calculates an operation signal MSst for controlling the starter 25A based on various signals to be input, and outputs the operation signal MSst to the starter 25A.

Next, a start control process over the engine 10, which is executed by the electronic control unit 30, will be described with reference to FIG. 3. The start control process over the engine 10 is executed when a request to start the engine 10 has been issued. Starting the engine 10, for example, not only includes starting resulting from turning on of an ignition switch (also referred to as an engine start switch, a system startup switch, or the like) by a driver of the vehicle but also automatic restarting after a temporary stop (idling stop) of the engine 10 while the vehicle stops at a red light, or the like.

Figure 3:
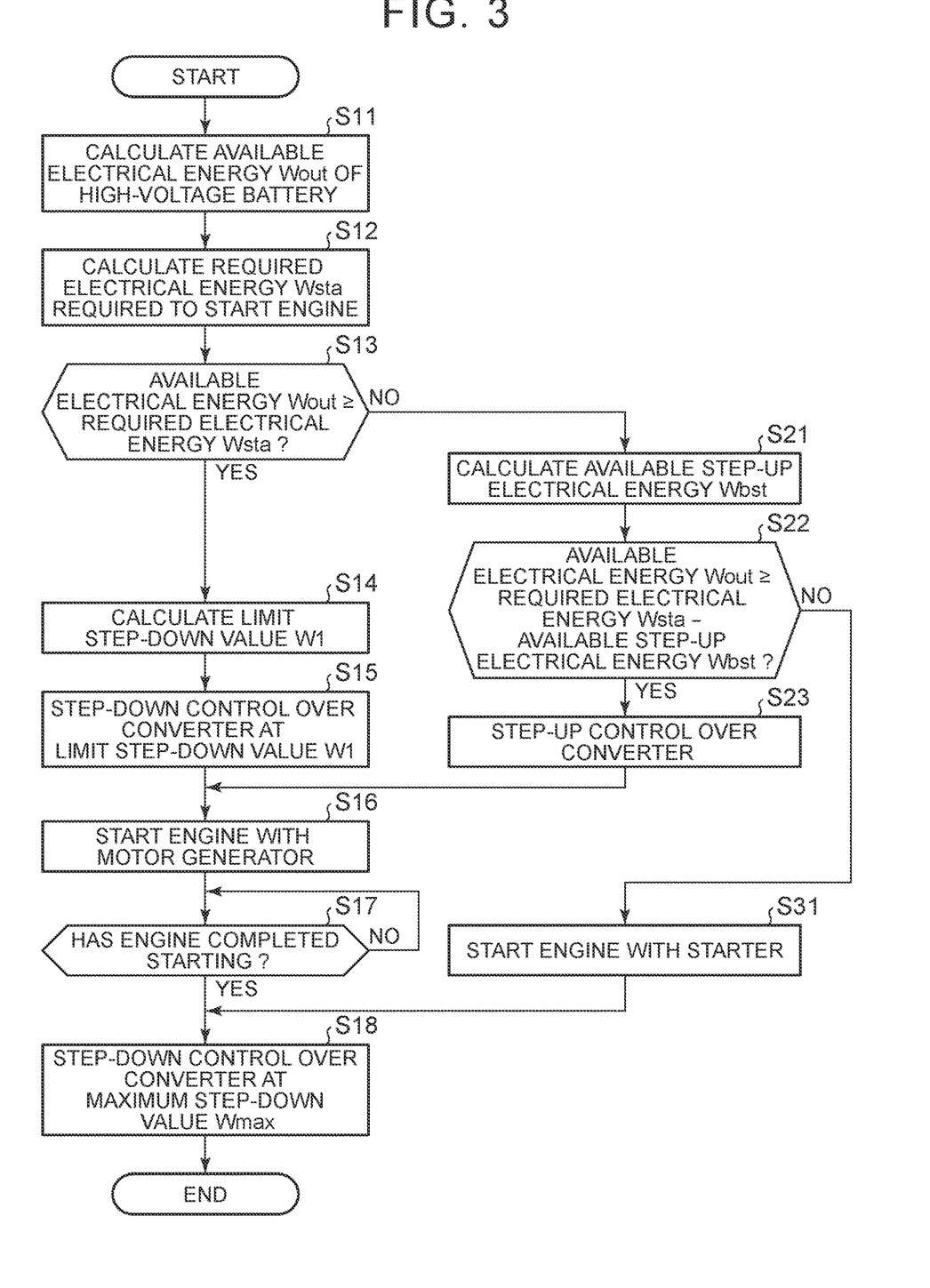
FIG. 3 is a flowchart that shows an engine start control process that is executed by an electronic control unit.

As shown in FIG. 3, as the start control process is started in response to a request to start the engine 10, the process of the electronic control unit 30 proceeds to step S11. In step S11, the electronic control unit 30 calculates an available electrical energy Wout from the high-voltage battery 22 to the motor generator 20. Specifically, the electronic control unit 30 calculates the available electrical energy Wout such that the available electrical energy Wout increases as the state of charge (SOC) estimated based on the status information IH of the high-voltage battery 22 increases. The electronic control unit 30 calculates the available electrical energy Wout such that the available electrical energy Wout increases as the state of health (SOH) estimated based on the status information IH of the high-voltage battery 22 increases (as the high-voltage battery 22 is less degraded). After that, the process of the electronic control unit 30 proceeds to step S12.

In step S12, the electronic control unit 30 calculates a required electrical energy Wsta that is a minimum electrical energy required to start the engine 10 with the use of the motor generator 20. In this embodiment, the electronic control unit 30 calculates the required electrical energy Wsta such that the required electrical energy Wsta increases as the coolant temperature THW decreases. When the coolant temperature THW is low, that is, when the temperature of the engine 10 is low, the viscosity of oil that lubricates the components of the engine 10 is high and the static friction of each of these components is large, so a larger energy is required to start the engine 10. As the required electrical energy Wsta is calculated, the process of the electronic control unit 30 proceeds to step S13.

In step S13, the electronic control unit 30 determines whether the available electrical energy Wout calculated in step S11 is larger than or equal to the required electrical energy Wsta calculated in step S12. When it is determined that the available electrical energy Wout is larger than or equal to the required electrical energy Wsta (YES in step S13), the process of the electronic control unit 30 proceeds to step S14.

Figure 2:
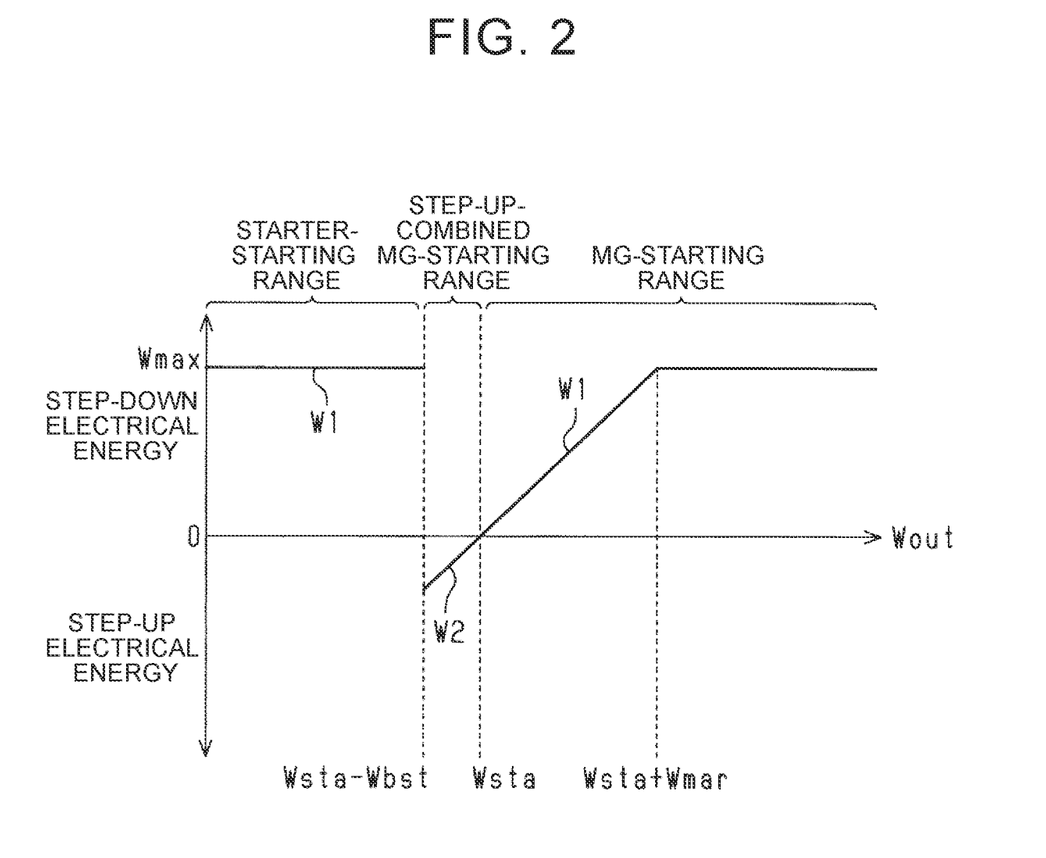
FIG. 2 is a graph that shows the relation between an available electrical energy of a high-voltage battery and a step-up or step-down electrical energy of a DC-DC converter.

In step S14, the electronic control unit 30 calculates a limit step-down value W1 as a limit value of an electrical energy at the time when the electric power of the high-voltage battery 22 is stepped down by the DC-DC converter 23 and is output to the low-voltage battery 24. Specifically, as shown in FIG. 2, when the available electrical energy Wout is equal to the required electrical energy Wsta, the electronic control unit 30 calculates the limit step-down value W1 as zero. When the available electrical energy Wout is larger than the required electrical energy Wsta and is smaller than a value obtained by adding a margin electrical energy Wmar to the required electrical energy Wsta, the limit step-down value W1 is calculated such that the limit step-down value W1 increases as the available electrical energy Wout increases. When the available electrical energy Wout is larger than or equal to the value obtained by adding the margin electrical energy Wmar to the required electrical energy Wsta, the limit step-down value W1 is calculated as a maximum step-down value Wmax.

The maximum step-down value Wmax is set as a maximum electric power that the DC-DC converter 23 is able to perform step down operation to output. The maximum step-down value Wmax is a fixed value that depends on the specifications of the DC-DC converter 23. The margin electrical energy Wmar is an electrical energy that is set as a margin for the required electrical energy Wsta. Specifically, the margin electrical energy Wmar is set such that, even when the DC-DC converter 23 steps down the electric power of the high-voltage battery 22 at the maximum step-down value Wmax and outputs the stepped-down electric power to the low-voltage battery 24, the high-voltage battery 22 is able to output an electrical energy sufficient to start the engine 10 with the use of the motor generator 20. The margin electrical energy Wmar may be set by, for example, experiment, simulation, or the like, in advance. After the limit step-down value W1 is calculated, the process of the electronic control unit 30 proceeds to step S15.

In step S15, the electronic control unit 30 outputs the operation signal MSc to control the DC-DC converter 23 such that electric power from the high-voltage battery 22 is stepped down and is output to the low-voltage battery 24 at the limit step-down value W1 calculated in step S14. When the DC-DC converter 23 is controlled in this way, the motor generator 20 is supplied with only electric power from the high-voltage battery 22. After that, the process of the electronic control unit 30 proceeds to step S16.

In step S16, the electronic control unit 30 starts the engine 10 by outputting the operation signal MSmg for driving the motor generator 20 to the motor generator 20. After the motor generator 20 is driven, the process of the electronic control unit 30 proceeds to step S17.

In step S17, the electronic control unit 30 determines whether the engine 10 has completed starting. Specifically, the electronic control unit 30 calculates the engine rotation speed of the engine 10 based on the rotation angle CA detected by the crank angle sensor 36. When the calculated engine rotation speed has reached a rotation speed (for example, approximately 600 to 800 rpm) set in advance as a rotation speed that the engine 10 is able to autonomously operate, the electronic control unit 30 determines that the engine 10 has completed starting. When it is determined that the engine 10 has not completed starting (NO in step S17), the electronic control unit 30 executes the process of step S17 again. When it is determined that the engine 10 has completed starting (YES in step S17), the process of the electronic control unit 30 proceeds to step S18.

In step S18, the electronic control unit 30 outputs the operation signal MSc to control the DC-DC converter 23 such that electric power from the high-voltage battery 22 is stepped down and is output to the low-voltage battery 24 at the maximum step-down value Wmax. After that, a series of the start control process over the engine 10, which is executed by the electronic control unit 30, ends.

On the other hand, in step S13, when it is determined that the available electrical energy Wout is smaller than the required electrical energy Wsta (NO in step S13), the process of the electronic control unit 30 proceeds to step S21.

In step S21, the electronic control unit 30 calculates an available step-up electrical energy Wbst as an electrical energy that the low-voltage battery 24 is able to supply to the motor generator 20 via the DC-DC converter 23. Specifically, the electronic control unit 30 calculates a state of charge obtained by subtracting a certain state of charge (for example, a state of charge) that is 50% of a full state of charge) from a state of charge estimated based on the status information IL of the low-voltage battery 24, as the available step-up electrical energy Wbst. When a value obtained by subtracting the certain state of charge from the state of charge of the low-voltage battery 24 is a negative value, the available step-up electrical energy Wbst is calculated as zero. After the available step-up electrical energy Wbst is calculated, the process of the electronic control unit 30 proceeds to step S22.

In step S22, the electronic control unit 30 determines whether the available electrical energy Wout calculated in step S11 is larger than or equal to the value obtained by subtracting the available step-up electrical energy Wbst from the required electrical energy Wsta. When affirmative determination is made (YES in step S22), the process of the electronic control unit 30 proceeds to step S23.

In step S23, the electronic control unit 30 outputs the operation signal MSc to control the DC-DC converter 23 such that electric power from the low-voltage battery 24 is stepped up and is output to the high-voltage battery 22. The electronic control unit 30 controls the DC-DC converter 23 such that a step-up electrical energy W2 of the DC-DC converter 23 at this time becomes an electrical energy obtained by subtracting the available electrical energy Wout from the required electrical energy Wsta. That is, an electrical energy short of the required electrical energy Wsta is provided by the step-up electrical energy W2 from the low-voltage battery 24. When the DC-DC converter 23 has been controlled in this way, not only electric power from the high-voltage battery 22 is supplied to the motor generator 20 but also electric power from the low-voltage battery 24 is stepped up and supplied to the motor generator 20. After that, the process of the electronic control unit 30 proceeds to step S16. The process of step S16 and the processes of the following step S17 and step S18 are as described above, so the description thereof is omitted.

On the other hand, in step S22, when it is determined that the available electrical energy Wout is smaller than the value obtained by subtracting the available step-up electrical energy Wbst from the required electrical energy Wsta (NO in step S22), the process of the electronic control unit 30 proceeds to step S31.

In step S31, the electronic control unit 30 starts the engine 10 with the use of the starter 25A by outputting the operation signal MSst to the starter 25A. After that, the process of the electronic control unit 30 proceeds to step S18. The process proceeds from step S31 to step S18 without waiting for completion of starting of the engine 10 with the use of the starter 25A. That is, when the engine 10 is started with the use of the starter 25A, electric power from the high-voltage battery 22 is stepped down and is supplied to the low-voltage battery 24. After that, a series of the start control process over the engine 10, which is executed by the electronic control unit 30, ends.

Hereinafter, the operation and advantageous effects of the present embodiment will be described. As shown in FIG. 2, in the present embodiment, when the available electrical energy Wout of the high-voltage battery 22 is larger than or equal to the required electrical energy Wsta that is a minimum electrical energy required to start the engine 10 with the use of the motor generator 20 (when the available electrical energy Wout falls within an MG-starting range), the motor generator 20 starts the engine 10 upon reception of electric power supplied from the high-voltage battery 22. At this time, the DC-DC converter 23 steps down electric power from the high-voltage battery 22, and supplies the stepped-down electric power to the low-voltage battery 24. That is, charging of the low-voltage battery 24 is continued.

For example, when electric power supplied from the DC-DC converter 23 to the low-voltage battery 24 stops each time the engine 10 is automatically restarted after the engine 10 temporarily stops (idling stop), charging and non-charging of the low-voltage battery 24 are repeated. Such a repetition of charging and non-charging causes degradation of the low-voltage battery 24. As described above, in the present embodiment, when the available electrical energy Wout of the high-voltage battery 22 is larger than or equal to the required electrical energy Wsta, charging of the low-voltage battery 24 is continued at the time when the engine 10 is started. Therefore, it is possible to reduce degradation of the low-voltage battery 24 due to charging and non-charging of the low-voltage battery 24.

In the present embodiment, when the available electrical energy Wout is larger than the required electrical energy Wsta and is smaller than the value obtained by adding the margin electrical energy Wmar to the required electrical energy Wsta, an electrical energy that the DC-DC converter 23 outputs to the low-voltage battery 24 is limited to the limit step-down value W1. The limit step-down value W1 increases as the available electrical energy Wout increases. In other words, the DC-DC converter 23 is controlled such that an electrical energy that is output from the high-voltage battery 22 to the low-voltage battery 24 reduces as the available electrical energy Wout of the high-voltage battery 22 approaches the required electrical energy Wsta. For this reason, it is less likely that an excessive electrical energy is supplied from the high-voltage battery 22 to the low-voltage battery 24 and, as a result, electric power that is supplied to the motor generator 20 is insufficient. Therefore, it is possible to continue supplying electric power from the high-voltage battery 22 to the low-voltage battery 24 while reliably starting the engine 10 with the use of the motor generator 20.

On the other hand, as shown in FIG. 2, in the present embodiment, even when the available electrical energy Wout of the high-voltage battery 22 is smaller than the required electrical energy Wsta, but when the available electrical energy Wout is larger than or equal to the value obtained by subtracting the available step-up electrical energy Wbst from the required electrical energy Wsta (when the available electrical energy Wout falls within a step-up-combined MG-starting range), the engine 10 is started with the use of the motor generator 20. That is, by using not only electric power from the high-voltage battery 22 but also electric power supplied from the low-voltage battery 24 and stepped up by the DC-DC converter 23, it is possible to start the engine 10 with the use of the motor generator 20. Therefore, in comparison with the case where the motor generator 20 is driven with only electric power supplied from the high-voltage battery 22, there are a larger number of opportunities (larger range) to start the engine 10 with the use of the motor generator 20.

In the present embodiment, the available step-up electrical energy Wbst is calculated in accordance with the state of charge of the low-voltage battery 24. Specifically, the available step-up electrical energy Wbst is generally calculated such that the available step-up electrical energy Wbst reduces as the state of charge of the low-voltage battery 24 reduces. Therefore, in starting the engine 10 with the use of the motor generator 20, it is possible to suppress an excessive decrease in the state of charge of the low-voltage battery 24 resulting from supplying a large electrical energy from the low-voltage battery 24 to the motor generator 20.

In the present embodiment, as shown in FIG. 2, when the available electrical energy Wout of the high-voltage battery 22 is smaller than the value obtained by subtracting the available step-up electrical energy Wbst from the required electrical energy Wsta (the available electrical energy Wout falls within a starter-starting range), the engine 10 is started with the use of the starter 25A. That is, in the present embodiment, when both the state of charge of the high-voltage battery 22 and the state of charge of the low-voltage battery 24 are low and the available electrical energy Wout of the high-voltage battery 22 is not able to start the engine 10 even upon reception of electric power supplied from the low-voltage battery 24, the engine 10 is started with the use of the starter 25A.

Generally, the starter 25A is able to efficiently produce rotating torque when the engine rotation speed of the engine 10 is close to zero. Since electric power supplied from the low-voltage battery 24 to the starter 25A does not pass through the DC-DC converter 23, there is no loss of electric power caused by voltage conversion of the DC-DC converter 23. On the other hand, the motor generator 20 is not able to produce rotating torque as efficiently as the starter 25A when the engine rotation speed of the engine 10 is close to zero. In driving the motor generator 20 with electric power from the low-voltage battery 24, there is also a loss of electric power caused by voltage conversion of the DC-DC converter 23. Therefore, in a situation in which both the state of charge of the high-voltage battery 22 and the state of charge of the low-voltage battery 24 are low, the engine 10 is reliably started when the engine 10 is stared with the use of the starter 25A as compared to when the engine 10 is started unreasonably with the use of the motor generator 20.

When the available electrical energy Wout of the high-voltage battery 22 is smaller than the value obtained by subtracting the available step-up electrical energy Wbst from the required electrical energy Wsta, electric power from the high-voltage battery 22 is supplied to the low-voltage battery 24 via the DC-DC converter 23. Therefore, it is possible to reduce a repetition of charging and non-charging of the low-voltage battery 24 resulting from starting of the engine 10, and it is possible to suppress an excessive decrease in the state of charge of the low-voltage battery 24 that supplies electric power to the starter 25A.

The present embodiment may be modified into the following alternative embodiments. The present embodiment and the following alternative embodiments may be implemented in combination without any technical contradiction. The mode in which the engine 10 and the motor generator 20 are drivingly coupled to each other is not limited to the above-described embodiment. For example, a speed reduction mechanism formed of a plurality of gears, or the like, a clutch that connects or interrupts a driving force transmission path, or another device, may be interposed between the engine 10 and the motor generator 20. That is, as long as the driving force of the motor generator 20 is transmitted to the engine 10 via some kind of mechanism and the engine 10 is able to be started, the above-described technique of the embodiment may be applicable with any mechanism. Furthermore, in addition to the motor generator 20 that is able to start the engine 10, a motor generator for power generation, which generates electric power upon reception of the rotating torque of the engine 10 and charges the high-voltage battery 22 with the generated electric power, may be provided.

The output voltage of the high-voltage battery 22 (main battery) and the output voltage of the low-voltage battery 24 (sub-battery) are not limited to the examples of the above-described embodiment. For example, the high-voltage battery 22 may be 24 V or 12 V that is lower than 48 V, or may be two hundred several tens of volts higher than 48 V. This also applies to the low-voltage battery 24. Furthermore, the output voltage of the high-voltage battery 22 and the output voltage of the low-voltage battery 24 are not necessarily different from each other, and may be the same. Even when the output voltages of these batteries are the same, the bidirectional DC-DC converter 23 needs to be provided in order to control charging and non-charging of the low-voltage battery 24 (sub-battery) and minutely arrange a voltage between both batteries.

The types of the high-voltage battery 22 and the low-voltage battery 24 are not limited to the examples of the above-described embodiment. For example, other than a lithium ion battery or a lead acid battery, a nickel-metal hydride battery or a NAS battery may be employed as the high-voltage battery 22 or the low-voltage battery 24.

A series of the start control process over the engine 10 may be applied to only any one of the case where the engine 10 is started as a result the fact that the driver of the vehicle has turned on the ignition switch and the case where the engine 10 is automatically restarted after a temporary stop of the engine 10.

A method of calculating the available electrical energy Wout of the high-voltage battery 22 is not limited. The method of calculating the available electrical energy Wout, described in the above-described embodiment, is only illustrative. For example, the available electrical energy Wout may be calculated in consideration of various parameters indicating the operation status of the vehicle in addition to the status information IH of the high-voltage battery 22. Similarly, the available step-up electrical energy Wbst of the low-voltage battery 24 may be calculated further in consideration of another piece of information in addition to the status information IL of the low-voltage battery 24.

A method of calculating the required electrical energy Wsta required to start the engine 10 with the use of the motor generator 20 may also be modified as needed. For example, depending on a stop position of the drive shaft (crankshaft) of the engine 10 while the engine 10 is stopped, an electrical energy required to start the engine 10 can vary. Therefore, the required electrical energy Wsta may be calculated in consideration of the rotation angle CA detected by the crank angle sensor 36 in addition to the coolant temperature THW.

In the above-described embodiment, a minimum electrical energy required to start the engine 10 with the use of the motor generator 20 is set as the required electrical energy Wsta. Instead, the required electrical energy Wsta may be modified as needed as long as the required electrical energy Wsta is larger than or equal to the minimum electrical energy required to start the engine 10 with the use of the motor generator 20. The calculatory available electrical energy Wout or required electrical energy Wsta that is calculated by the electronic control unit 30 is not always accurate. Even when the calculatory available electrical energy Wout is larger than or equal to the required electrical energy Wsta, the actual available electrical energy Wout can be smaller than the required electrical energy Wsta. In consideration to such a situation, if the required electrical energy Wsta is set to a value considerably larger than the minimum electrical energy required to start the engine 10 with the use of the motor generator 20, even when the calculatory available electrical energy Wout or the calculatory required electrical energy Wsta somewhat deviates from the actual available electrical energy Wout or the actual required electrical energy Wsta, it is possible to appropriately execute start control over the engine 10.

The available step-up electrical energy Wbst is not calculated in accordance with the state of charge of the low-voltage battery 24, and may be set as a predetermined fixed value. Generally, charging of the low-voltage battery 24 is controlled such that the state of charge of the low-voltage battery 24 falls within a set range. The available step-up electrical energy Wbst should be determined in advance on the assumption that the state of charge of the low-voltage battery 24 falls within the set range. With such a method of determining the available step-up electrical energy Wbst, there is a low possibility that the state of charge of the low-voltage battery 24 excessively decreases as a result of starting of the engine 10 with the use of the motor generator 20.

Even when the available electrical energy Wout of the high-voltage battery 22 is smaller than the value obtained by subtracting the available step-up electrical energy Wbst from the required electrical energy Wsta, the engine 10 may be started with the use of the motor generator 20. If the available electrical energy Wout of the high-voltage battery 22 is somewhat low, it can be possible to start the engine 10 with the use of the motor generator 20 by, for example, increasing fuel injection amount at the time of starting the engine 10 to compensate for rotating torque.

When the available electrical energy Wout of the high-voltage battery 22 is larger than or equal to the required electrical energy Wsta, an electrical energy that the DC-DC converter 23 outputs to the low-voltage battery 24 is not limited to the limit step-down value W1, and the DC-DC converter 23 may output electric power to the low-voltage battery 24 at a certain electric power (for example, the maximum step-down value Wmax). In this case, for example, at the time when the engine 10 is started with the use of the motor generator 20, if the required electrical energy Wsta is set in anticipation of the fact that commensurate electric power is supplied from the high-voltage battery 22 to the low-voltage battery 24, it is possible to prevent shortage of electric power that is supplied to the motor generator 20.

When the available electrical energy Wout of the high-voltage battery 22 is larger than or equal to the required electrical energy Wsta and is smaller than the value obtained by adding the margin electrical energy Wmar to the required electrical energy Wsta, at the time when the engine 10 is started, electric power may be not supplied from the high-voltage battery 22 to the low-voltage battery 24 by stopping the operation of the DC-DC converter 23. Furthermore, when the available electrical energy Wout of the high-voltage battery 22 is larger than or equal to the required electrical energy Wsta, the operation of the DC-DC converter 23 may be constantly stopped at the time when the engine 10 is started.

What is claimed is:

1. A hybrid vehicle comprising:
an engine;
a motor generator coupled to the engine;
a main battery configured to supply electric power to the motor generator;
a DC-DC converter configured to convert a voltage of electric power from the main battery and the motor generator, and output the electric power;
a sub-battery configured to be supplied with electric power from the DC-DC converter;
a starter configured to start the engine when supplied with direct-current power from the sub-battery; and
an electronic control unit configured to start the engine with the use of any one of the starter and the motor generator,
the DC-DC converter being a bidirectional converter configured to convert a voltage of electric power from the sub-battery and output the electric power to the motor generator, and
the electronic control unit being configured to control the DC-DC converter such that the sub-battery outputs electric power to the motor generator when a first available electrical energy of the main battery is smaller than a required electrical energy at a time when the engine is started with the use of the motor generator, the required electrical energy being set as a value larger than or equal to a minimum electrical energy required to start the engine with the use of the motor generator.

2. The hybrid vehicle according to claim 1, wherein
the electronic control unit is configured to, when the first available electrical energy of the main battery is larger than or equal to the required electrical energy, control the DC-DC converter such that the main battery outputs electric power to the sub-battery, and start the engine with the use of the motor generator.

3. The hybrid vehicle according to claim 2, wherein
the electronic control unit is configured to, when the first available electrical energy of the main battery is larger than or equal to the required electrical energy, control the DC-DC converter such that an electrical energy that is output from the main battery to the sub-battery reduces as the first available electrical energy of the main battery approaches the required electrical energy.

4. The hybrid vehicle according to claim 1, wherein:
the electronic control unit is configured to calculate a second available electrical energy available to be supplied from the sub-battery to the motor generator;
the electronic control unit is configured to, when the first available electrical energy of the main battery is larger than or equal to a value obtained by subtracting the second available electrical energy from the required electrical energy and is smaller than the required electrical energy, control the DC-DC converter such that the sub-battery outputs electric power to the motor generator, and start the engine with the use of the motor generator; and
the electronic control unit is configured to, when the first available electrical energy of the main battery is smaller than the value obtained by subtracting the second available electrical energy from the required electrical energy, control the DC-DC converter such that the main battery outputs electric power to the sub-battery, and start the engine with the use of the starter.

5. The hybrid vehicle according to claim 4, wherein
the electronic control unit is configured to calculate the second available electrical energy such that the second available electrical energy increases as a state of charge of the sub-battery increases.

6. The hybrid vehicle according to claim 1, further comprising
a temperature sensor configured to detect a coolant temperature of the engine, wherein
the electronic control unit is configured to calculate the required electrical energy such that the required electrical energy increases as the coolant temperature of the engine decreases.

7. A control method for a hybrid vehicle, wherein the hybrid vehicle includes an engine, a motor generator coupled to the engine, a main battery configured to supply electric power to the motor generator, a DC-DC converter configured to convert a voltage of electric power from the main battery and the motor generator and output the electric power, a sub-battery configured to be supplied with electric power from the DC-DC converter, a starter configured to start the engine when supplied with direct-current power from the sub-battery, and an electronic control unit configured to start the engine with the use of any one of the starter and the motor generator, the DC-DC converter being a bidirectional converter configured to convert a voltage of electric power from the sub-battery and output the electric power to the motor generator, the control method comprising controlling, by the electronic control unit, the DC-DC converter such that the sub-battery outputs electric power to the motor generator when a first available electrical energy of the main battery is smaller than a required electrical energy at a time when the engine is started with the use of the motor generator, the required electrical energy being set as a value larger than or equal to a minimum electrical energy required to start the engine with the use of the motor generator.

* * * * *